(12) United States Patent
Long

(10) Patent No.: US 7,694,427 B2
(45) Date of Patent: Apr. 13, 2010

(54) PIPE FITTING WIREFORM FOR MEASURING LINEAR DISTANCE AND METHOD

(76) Inventor: Fredrick D. Long, P.O. Box 26, Union, MO (US) 63084

( * ) Notice: Subject to any disclaimer, the term of this patent is extended or adjusted under 35 U.S.C. 154(b) by 93 days.

(21) Appl. No.: 12/164,737

(22) Filed: Jun. 30, 2008

(65) Prior Publication Data

US 2009/0015004 A1    Jan. 15, 2009

Related U.S. Application Data

(60) Provisional application No. 60/949,438, filed on Jul. 12, 1997.

(51) Int. Cl.
  *G01B 5/14* (2006.01)
  *G01D 21/00* (2006.01)
(52) U.S. Cl. .......................... 33/520; 33/644
(58) Field of Classification Search .............. 33/520, 33/644
  See application file for complete search history.

(56) References Cited

U.S. PATENT DOCUMENTS

| | | | |
|---|---|---|---|
| 3,308,545 A * | 3/1967 | Freimark | ..................... 33/520 |
| 4,327,493 A * | 5/1982 | Dickerson | ..................... 33/520 |
| 4,399,616 A | 8/1983 | Jansson | |
| 4,476,635 A | 10/1984 | Hart | |
| 4,696,110 A | 9/1987 | Walker et al. | |
| 4,754,551 A * | 7/1988 | Scott | ............................ 33/543 |
| 4,773,164 A * | 9/1988 | Taylor et al. | ................... 33/520 |
| 4,811,489 A | 3/1989 | Walker | |
| 5,179,788 A * | 1/1993 | Jadach | ........................ 33/644 |
| 5,979,068 A * | 11/1999 | Andrews | ...................... 33/520 |
| 6,158,137 A * | 12/2000 | Bramlett | ...................... 33/520 |
| 6,314,656 B1 * | 11/2001 | Morel et al. | ................... 33/644 |
| 6,536,129 B2 * | 3/2003 | Segal et al. | .................... 33/644 |
| 6,550,156 B1 | 4/2003 | Scoville | |
| 6,615,503 B1 * | 9/2003 | Nzomigni et al. | .............. 33/520 |
| 6,732,445 B1 | 5/2004 | Scoville | |
| 6,790,218 B2 * | 9/2004 | Jayaraman | ................... 606/191 |

\* cited by examiner

*Primary Examiner*—Christopher W Fulton
(74) *Attorney, Agent, or Firm*—Grace J. Fishel

(57) ABSTRACT

A pipe fitting wireform which when threaded into a fitting allows a user to measure center-to-end or end-to-center of the fitting to determine the length of a pipe needed to connect a pair of pipe fittings in a pipe assembly. The fitting wireform is a coil with a free end bent laterally to form a tang. The fitting wireform having an outside diameter substantially equal to the nominal size of the pipe fitting with substantially the same number of turns per inch as the pipe fitting such that the pipe fitting wireform can be threaded into the pipe fitting.

4 Claims, 5 Drawing Sheets

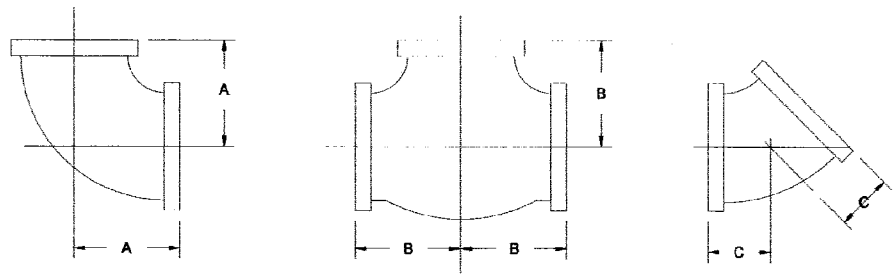
| Pipe Size | 90° Elbow | | Tee | | 45° Elbow | |
|---|---|---|---|---|---|---|
| | A | Take Out | B | Take Out | C | Take Out |
| 1/8 | 11/16 | 7/16 | 11/16 | 7/16 | 9/16 | 1/4 |
| 1/4 | 13/16 | 7/16 | 13/16 | 7/16 | 3/4 | 3/8 |
| 3/8 | 15/16 | 9/16 | 15/16 | 9/16 | 13/16 | 7/16 |
| 1/2 | 1 1/8 | 5/8 | 1 1/8 | 5/8 | 7/8 | 3/8 |
| 3/4 | 1 5/16 | 3/4 | 1 5/16 | 3/4 | 1 | 7/16 |
| 1 | 1 1/2 | 7/8 | 1 1/2 | 7/8 | 1 1/3 | 9/16 |
| 1 1/4 | 1 3/4 | 1 1/8 | 1 3/4 | 1/1/8 | 1 5/16 | 11/16 |
| 1 1/2 | 1 15/16 | 1 1/4 | 1 15/16 | 1 1/4 | 1 7/16 | 3/4 |
| 2 | 2 1/4 | 1 5/8 | 2 1/4 | 1 5/8 | 1 11/16 | 1 |
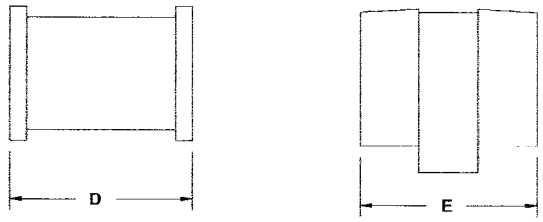
| Pipe Size | Thread Make-Up | Coupling | | Union | |
|---|---|---|---|---|---|
| | | D | Take Out | E | Take Out |
| 1/8 | 1/4 | 1 | 1/4 | 1 1/2 | 3/4 |
| 1/4 | 3/8 | 1 1/8 | 3/8 | 1 5/8 | 7/8 |
| 3/8 | 3/8 | 1 1/4 | 3/8 | 1 3/4 | 1 |
| 1/2 | 1/2 | 1 3/8 | 3/8 | 1 7/8 | 1 |
| 3/4 | 9/16 | 1 1/2 | 3/8 | 2 1/8 | 1 1/16 |
| 1 | 9/16 | 1 3/4 | 1/2 | 2 3/8 | 1 1/4 |
| 1 1/4 | 5/8 | 2 | 3/4 | 2 5/8 | 1 3/8 |
| 1 1/2 | 5/8 | 2 1/2 | 7/8 | 3 | 1 1/2 |
| 2 | 11/16 | 2 1/2 | 1 1/4 | 3 1/4 | 1 3/4 |
*Fig. 10 (Prior Art)*

PIPE FITTING WIREFORM FOR MEASURING LINEAR DISTANCE AND METHOD

This application claims priority from provisional application 60/949,438 filed Jul. 12, 2007, for Pipe Fitting for Measuring Linear Distance and Method.

BACKGROUND OF THE INVENTION

1. Field of the Invention

The present invention relates to a pipe fitting wireform for field or shop application for measuring the center-to-end or end-to-center of a fitting to determine the end-to-end length of a pipe needed to connect a pair of pipe fittings in a pipe assembly.

2. Brief Description of the Prior Art

Dimensions on pipe drawings specify the center lines and/or points on center lines; they do not specify pipe lengths. This system of distance dimensioning and measurement is also followed in the fabrication and installation of pipe assemblies.

To determine actual pipe length, allowances must be made for the length of the fittings and the distance the pipe-to-be-cut will be threaded into the fitting. The method of doing this is to subtract an amount called the take-out from the center-to-center dimension. The relationships of the take-out to other threaded pipe connection distances, termed make-up, center-to-center and end-to-end are illustrated in FIG. 5. To determine end-to-end pipe length, the take-out is subtracted from the center-to-center dimension. Standard tables as shown in FIG. 5 may be used for this purpose.

Particularly in field installations, it is difficult for a man working by himself to make the center-to-end or end-to-center measurement between the fittings on the pipes to be joined. In addition, the standard tables used to determine the take-out must be used with judgment since commercially available fittings may vary by one turn or more plus or minus. Hence on critical connections, materials should be checked and compensation made for variances in the fittings.

In view of the above, it would be desirable to have a pipe fitting wireform that makes it easier for a man working by himself to make the center-to-end or end-to-center measurement and which may be used to compensate for variances in at least one of the fittings to be joined.

BRIEF SUMMARY OF THE INVENTION

In view of the above, it is an object of the present invention to provide a pipe fitting wireform which can be used by a workman to measure the center-to-end or end-to-center length of a pipe needed in a pipe assembly. It is another object to provide a pipe fitting wireform which may be used to correct for variances in the fittings. Other objects and features of the invention will be in part apparent and in part pointed out hereinafter.

In accordance with the present invention, a pipe fitting wireform is provided for use in conjunction with a tape measure to determine the center-to-end or end-to-center length of a pipe needed to connect first and second pipes into a pipe assembly. The pipe fitting wireform comprises a circular coil of spring steel having an outside diameter substantially equal to the nominal size of a first pipe fitting attached to the first of the pipes-to-be-joined. The coil also has substantially the same number of turns per inch as said pipe fitting such that the pipe fitting wireform can be threaded into the pipe fitting. A free end of the coil is bent to form a tang which passes laterally through the center of the coil from one side to the other. When the pipe fitting wireform is installed in the fitting, a free end of the tape measure may be hooked on the tang of the pipe fitting wireform and the center-to-end or end-to-center distance between the first fitting and a second fitting on the second of the pipes-to-be-joined measured. Adjustments are made for make-up and take-out, depending on whether the measurer is hooked on the tang flush with the face of the fitting or hooked inside of the make-up to arrive at the end-to-end length of the pipe needed for the connection.

The pipe fitting wireform may include stacked first and second coils of different diameters such that the pipe fitting wireform fits two different sized fittings. Different pipe fitting wireforms, each accommodating two sizes, may be provided to accommodate a range of standard fittings.

The invention summarized above comprises the constructions and methods hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 5:
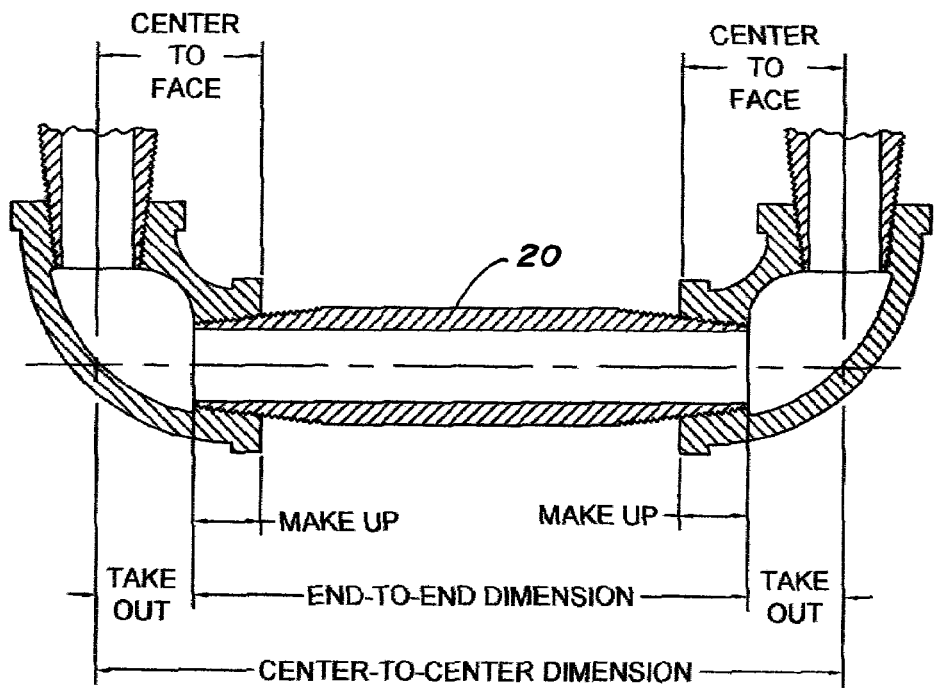
FIG. 5 is a side elevation in section showing first and second pipes joined through first and second fittings by a third pipe.
Figure 6:
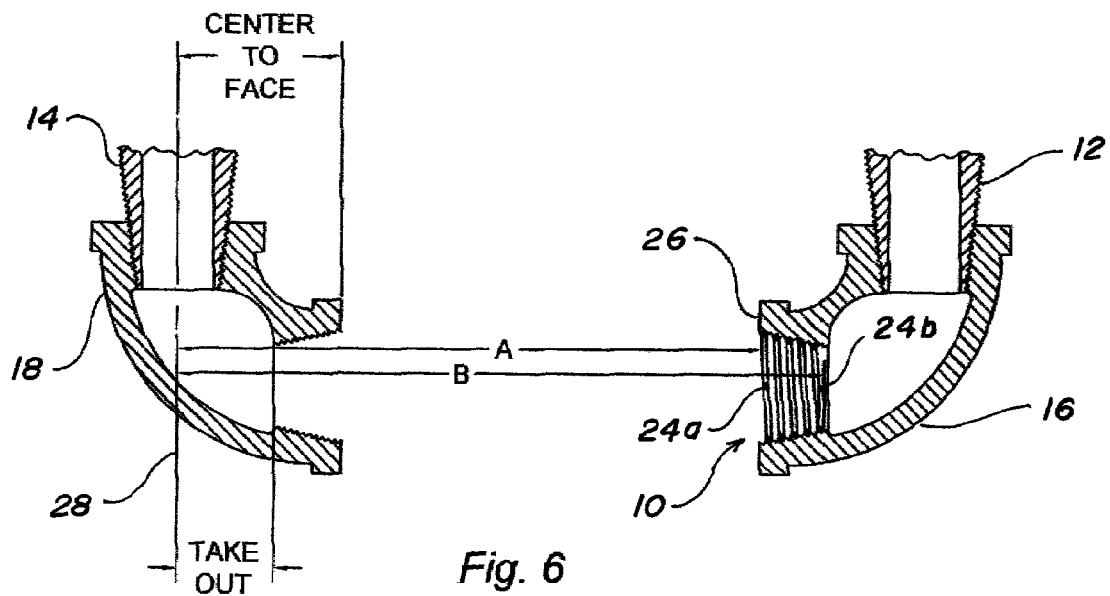
FIG. 6 is a side elevation in section illustrating measurements which must be made to determine the end-to-end length needed for the third pipe.

Referring to the drawings more particularly by reference character, reference numeral 10 refers to a pipe fitting wireform in accordance with the present invention. For use in joining a first pipe-to-be-joined 12 with a second pipe-to-be-joined 14 as illustrated in FIG. 6, a first screw threaded fitting 16 may be temporarily attached to first pipe-to-be-joined 12 and a second screw threaded fitting 18 may be attached to second pipe-to-be-joined 14. Pipe fitting wireform 10 may then be used to determined an end-to-end length of a third pipe 20 (FIG. 5) which is cut and threaded to connect first and second pipes-to-be-joined 12, 14 through first and second fittings 16, 18.

Figure 1:
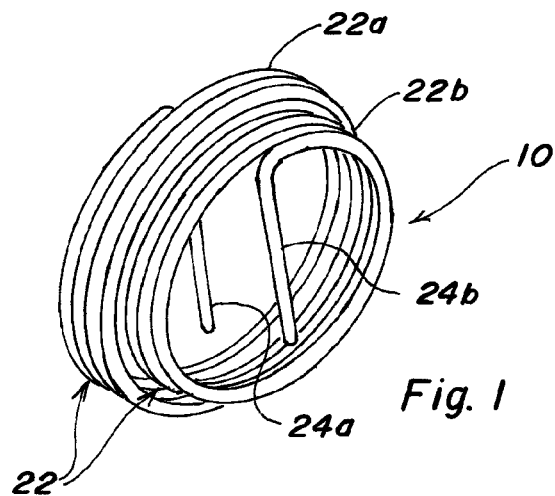
FIG. 1 is a perspective view of a pipe fitting wireform in accordance with the present invention.
Figure 2:
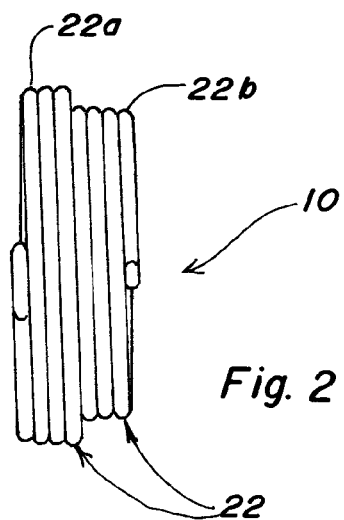
FIG. 2 is a side elevation of the pipe fitting wireform.
Figure 3:
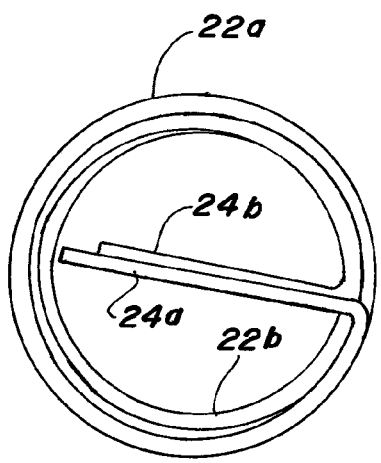
FIG. 3 is a left end view of the pipe fitting wireform.
Figure 4:
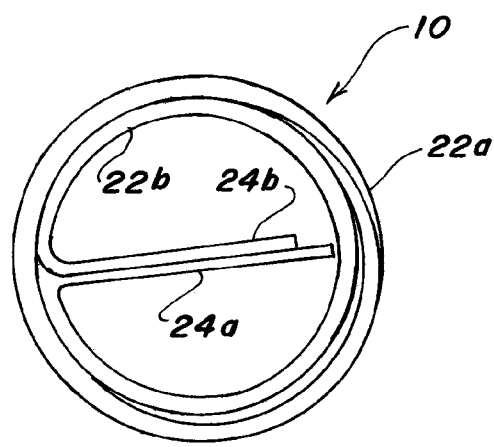
FIG. 4 is a right end view of the pipe fitting wireform.

As seen in FIGS. 1-4, pipe fitting wireform 10 is a coil 22 of spring steel having an outside diameter substantially equal to the nominal size of one of said pipe fittings 16, 18, for example fitting 16. The coils of pipe fitting wireform 10 have substantially the same number of turns per inch as pipe fitting 16 such that pipe fitting wireform 10 can be threaded into pipe fitting 16. As seen in FIGS. 1 and 3-4, a free end of coil is bent to form a tang 24 which passes laterally from one side of the coil to the other through the center. For use with two different sized fittings, pipe fitting wireform 10 may have a pair of coils 22a, 22b stacked with tangs 24a, 24b in registry.

Coils 22a, 22b may be offered in different sizes to accommodate a range of standard fittings. For example, coil 22a may be designed for a 1 inch fitting and coil 22b for a ¾ inch fitting. In another fitting wireform 10, coil 22a may have an outside diameter of 1½ inch and coil 22b an outside diameter of 1¼ inch. In still yet another fitting wireform 10, coil 22a may have an outside diameter of 3 inches and coil 22b an outside diameter of 2½ inches and so forth.

For use in measuring an end-to-end length of third pipe 20, pipe fitting wireform 10 may be threaded into fitting 16 as shown in FIG. 6 and the end of a tape measure hooked on one of tangs 24a, 24b. Since the end of the tape measure is secured to one of tangs 24a, 24b, the measurement may be taken by a workman working alone. If a measurement A is taken from a face 26 of first fitting 16 to a centerline 28 of second fitting 18, the measurement must be adjusted to compensate for the make-up in fitting 16 and the take-out in fitting 18 by reference to a table such as shown in FIG. 10. If a measurement B is taken from the inside of the make-up in fitting 16 to centerline 28 of second fitting 18, the measurement must only be adjusted for the take-out in fitting 18. This is a more accurate measurement as any variance in first fitting 16 from a standard table is compensated for by pipe fitting wireform 10.

Figure 7:
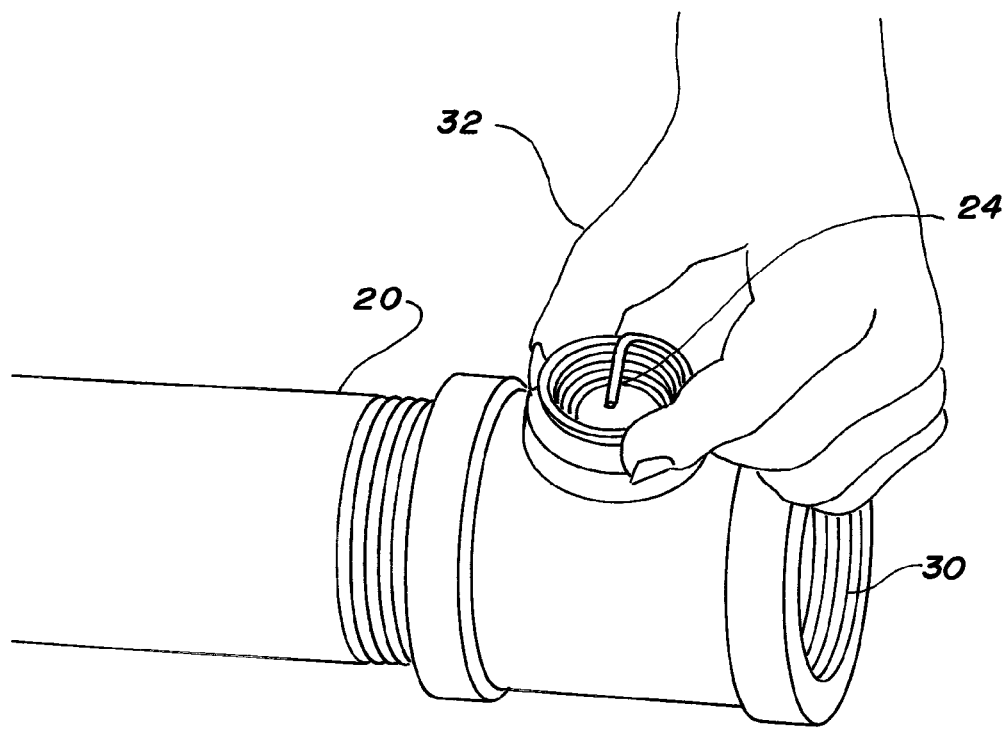
FIG. 7 is a photograph showing a tee fitting in which the pipe fitting wireform has been screwed, said tee fitting attached to the third pipe before it is cut to length.
Figure 8:
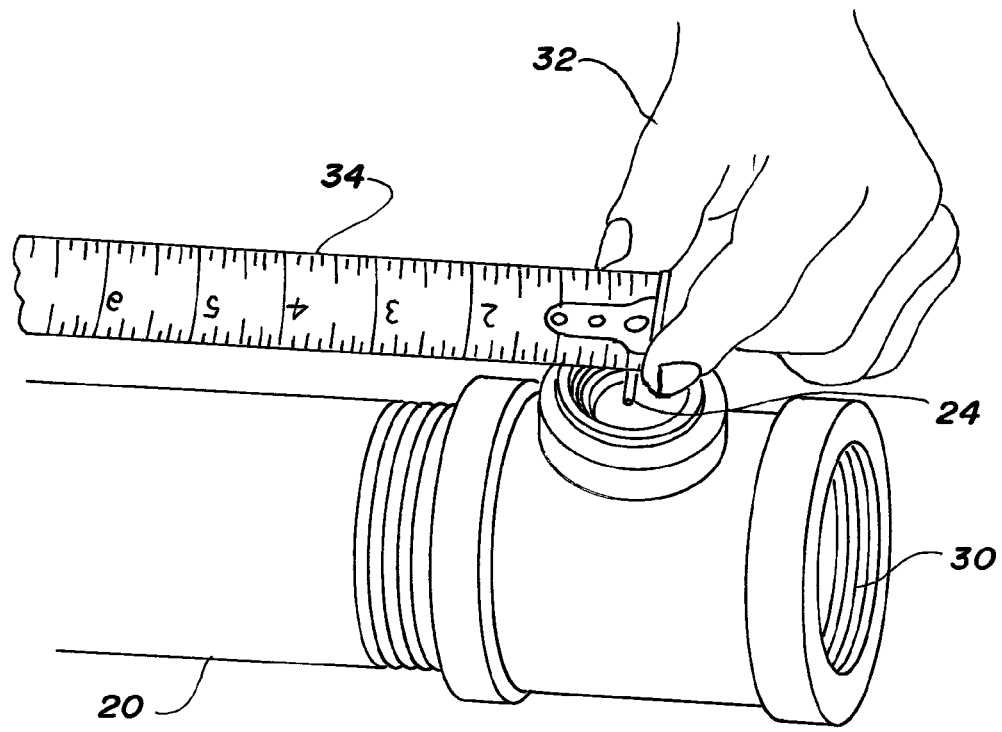
FIG. 8 is a photograph showing a tape measure hooked into the pipe fitting wireform.
Figure 9:
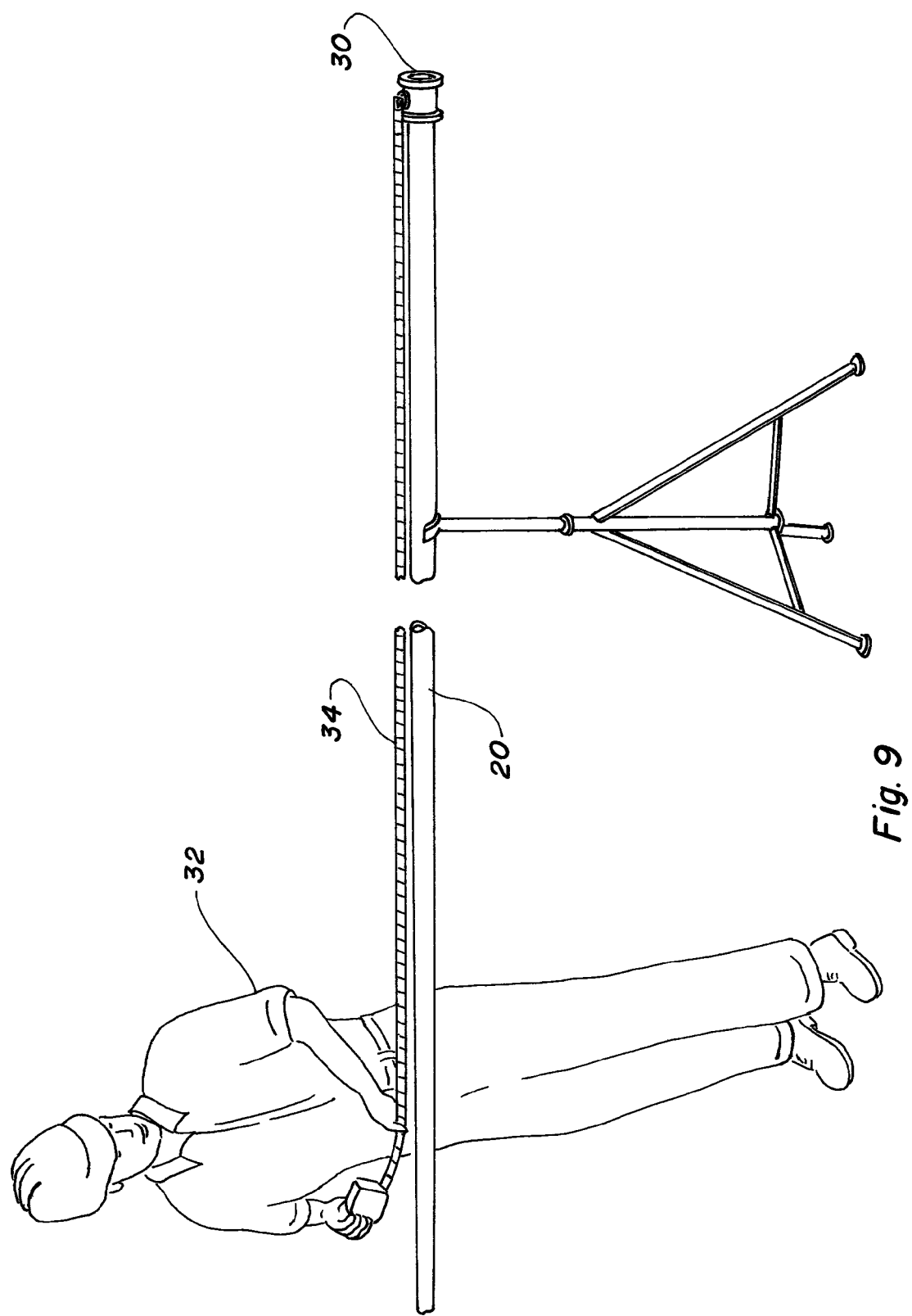
FIG. 9 is photograph showing a workman measuring the third pipe to make the center-to-end cut; and, FIG. 10 shows tables with the take-out for fittings of various sizes.

As shown in FIGS. 7-9, the measurement determined above may be used to cut third pipe 20. A tee fitting 30 may be attached to a threaded end of third pipe 20. The field measurement is then adjusted, as needed by reference to a table (FIG. 10) if the take-out of tee 30 is different from the take-out of 90° fitting 16. As shown in FIG. 8, a workman 32 hooks tape measure 34 on tang 24, stretches the tape along third pipe 20 and in FIG. 9 marks third pipe 20 where it will be cut. In the prior art, a person working alone must hook the tape on the end of the pipe and press tape measure 34 hand over hand against third pipe 20 until the length for the cut is reached. Handling the tape measure in this manner tends to bend it, which operation is avoided with pipe fitting wireform 10.

In view of the above, it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed:

1. A pipe fitting wireform for use in determining a center-to-end or end-to-center pipe length for joining a pair of pipe fittings attached to a first and second pipe-to-be-joined, said pipe fitting wireform comprising a first circular coil of spring steel, said coil having an outside diameter substantially equal to the nominal size of one of said pipe fittings, said coil having substantially the same number of turns per inch as said pipe fitting such that the pipe fitting wireform can be threaded into the pipe fitting, said coil having a free end bent laterally to form a tang which passes through the center of the coil from one side to the other.

2. The pipe fitting wireform of claim 1 wherein said a second circular coil of spring steel is stacked on the first circular coil, said first and second coils having different diameters equal to the nominal size of two different sized pipe fittings.

3. A method for determining a center-to-end or end-to-center pipe length for joining a pair of pipe fittings attached to a first and second pipe-to-be-joined comprising the steps of providing a pipe fitting wireform comprising a coil of spring steel, said coil having an outside diameter substantially equal to the nominal size of one of said pipe fittings, said coil having substantially the same number of turns per inch as said pipe fitting such that the pipe fitting wireform can be threaded into the pipe fitting, said coil having a free end bent laterally to form a tang which passes through the center of the coil from one side to the other, threading the pipe fitting wireform into said pipe fitting with the tang side last until the tang is flush with a face of the fitting, hooking a free end of a tape measure on the tang and measuring the distance between the tang and the center of the second fitting;

adjusting the measured length for the make-up on the first fitting and the take-out on the second fitting.

4. A method for determining an center-to-end or end-to-center pipe length for joining a pair of pipe fittings attached to a first and second pipe-to-be-joined together comprising the steps of providing a pipe fitting wireform comprising a coil of spring steel, said coil having an outside diameter substantially equal to the nominal size of one of said pipe fittings, said coil having substantially the same number of turns per inch as said pipe fitting such that the pipe fitting wireform can be threaded into the pipe fitting, said coil having a free end bent laterally to form a tang which passes through the center of the coil from one side to the other, threading the pipe fitting wireform into the said pipe fitting with the tang side first to the extent of the make-up, hooking a free end of a tape measure on the tang and measuring the distance between the tang and the center of the second fitting;

adjusting the measured length for the take-out on the second fitting.

\* \* \* \* \*